United States Patent [19]

Waddill et al.

[11] Patent Number: 5,086,155

[45] Date of Patent: Feb. 4, 1992

[54] 1-ISOPROPYL-2-TOLYLIMIDAZOLE AS AN EPOXY RESIN CURATIVE

[75] Inventors: Harold G. Waddill; Wei-Yang Su; George P. Speranza, all of Austin, Tex.

[73] Assignee: Texaco Chemical Company, White Plains, N.Y.

[21] Appl. No.: 589,110

[22] Filed: Sep. 27, 1990

[51] Int. Cl.$^5$ .................. C08G 59/68; C08G 59/50
[52] U.S. Cl. ................................ 528/94; 528/117
[58] Field of Search .......................... 528/94, 117

[56] References Cited

U.S. PATENT DOCUMENTS 4,931,528  6/1990  Waddill et al. ................. 528/94

FOREIGN PATENT DOCUMENTS 63-308030A  12/1988  Japan .

Primary Examiner—John Kight, III
Assistant Examiner—Frederick Krass
Attorney, Agent, or Firm—Jack H. Park; Kenneth R. Priem; Cynthia L. Kendrick

[57] ABSTRACT

Disclosed is an epoxy resin curative exhibiting extended pot life, lower reactivity and lower viscosity at ambient temperatures and increased reactivity at moderately elevated temperatures which comprises from 1 to 10 parts by weight of the ortho, meta or para form of 1-isopropyl-2-tolylimidazole per 100 parts by weight epoxy resin. The latent reactive properties make the curative potentially useful in a variety of applications.

12 Claims, No Drawings

1-ISOPROPYL-2-TOLYLIMIDAZOLE AS AN EPOXY RESIN CURATIVE

BACKGROUND OF THE INVENTION

1. Cross-Reference

This application is related to U.S. Pat. No. 4,931,528.

2. Field of the Invention

This invention relates to epoxy resin curing agents. More particularly this invention relates to the composition 1-isopropyl-2-tolylimidazole and to its use in curing epoxy resin systems and providing stable one-component mixtures with a high degree of resistance to heat and chemicals. Further, epoxy systems cured with this novel curative demonstrate a low degree of reactivity and lower viscosities at ambient temperatures and increasingly accelerated rates of reactivity at moderately elevated temperatures, thus providing a variety of application possibilities.

3. Related Art

Epoxy resins include a broad class of polymeric materials having a wide range of physical properties. The resins are characterized by epoxide groups which are cured by reaction with certain catalysts or curing agents to provide cured epoxy resin compositions with various desirable properties.

The most common epoxy resins are condensation products of epichlorohydrin and the diglycidyl ether of Bisphenol A (DGEBA). These systems can be cured with conventional curing agents such as polyamines, polycarboxylic acids, anhydrides and Lewis acids. Bisphenol A based epoxy compositions, when cured, have good adhesive properties, however many are inherently stiff and brittle and hence their use is limited to applications where peel forces do not come into play.

It is known in the art to use some substituted imidazoles as curing agents for epoxy resins. In [95] Chemical Week, July 31, 1965 it is stated imidazoles generally offer, when used at low concentration, HDT's to 150° C. with DGEBA and other elevated-temperature properties in the range expected of aromatic amine cures. This improved heat resistance is obtained with a supercooled liquid having a viscosity of 4000 to 8000 centipoises and providing a long pot life. Generally, imidazoles are in solid form and cause predictable results with the resin to be cured. For instance, one could expect a substantial amount of gelling of the resin at lower temperatures.

It is known to use salts of imidazoles and alkyl imidazoles as semi-latent epoxy curatives as described in data sheets from Shikodu titled

"CUREZOL 2MZ-OK".
2PZ-OK

In that work what is disclosed is curatives consisting of isocyanuric acid addition compounds in the form of crystals. Such salts are usually solid products which either melt or decompose at rather high temperatures.

2-Ethyl-4-methylimidazole is described in the chemical literature as an epoxy curative. See *Handbook of Epoxy Resins*, Lee and Neville, Ref. 95, Ch 10 (1965).

Japanese Patent 633 080 30-A describes hardeners containing 1-alkyl-2-phenylimidazoles where the alkyl group contains 1–6 carbons.

New curing agents for epoxy resins are useful and desirable, especially if they demonstrate unusual and useful properties. It would be an advance in the art to provide an imidazole epoxy resin curing agent which would easily dissolve and mix with many epoxy systems. Further, it would be an advance in the art if the curative added latency to the epoxy systems to which it was added. If such a curative provided a formulation which was less viscous than formulations using related curing agents, such that a much longer time was available for utilization of the curing agent after mixing, this would constitute an improvement over what is available in the art. If such a system, when fully cured could demonstrate acceptable physical properties with exceptional resistance to heat and chemicals, it would meet a number of needs in the art. If a curative with the above properties also allowed for variations in reactivity over a broad range of temperatures and differences in physical state depending upon whether the ortho, meta or para form were used, this would be particularly desirable and a variety of potential applications would be apparent to those skilled in the art.

It has now been discovered that the composition comprising 1-isopropyl-2-(ortho, meta or para)-tolylimidazole can be employed in liquid form as an epoxy resin curative to provide these and other desirable properties.

SUMMARY OF THE INVENTION

The present invention is directed to the composition 1-isopropyl-2-tolylimidazole and to the use of any of its several forms as curatives of epoxy resins. As a curing agent, small quantities are quite effective and all formulations (ortho, meta or para) dissolve readily into a variety of epoxy resins and are completely compatible. In addition, it provides a lengthy pot life at ambient temperatures, but cures readily at moderately elevated temperatures, thus adding latency in curing to the epoxy systems to which it is added.

DETAILED DESCRIPTION

The imidazole used as a curing agent of uncured epoxy resins in the present invention is a member of a group of imidazoles having the following general formula:

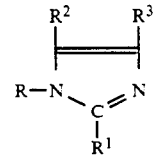

wherein R is H or an alkyl group containing 1 to 18 carbon atoms, $R_1$ is H or an aromatic or alkyl group containing 1 to 17 carbons, $R_2$ is H or an alkyl group containing 1–4 carbon atoms, and $R_3$ is H or an alkyl group containing 1–4 carbon atoms.

In the instant invention it has been discovered that the composition 1-isopropyl-2-(ortho, meta or para)-tolylimidazole demonstrates properties which make it particularly valuable as a curing agent. The 1-isopropyl-2-tolylimidazole is prepared by a method comprising dehydrogenation of the corresponding imidazolines over a catalyst consisting of nickel in combination with from 2 to 30% copper or chromium alone or in combination, at a temperature of b 160° C. to 250° C. and a pressure of atmospheric to 500 psig. (see U.S. Pat. Nos. 4,927,942 and 4,921,969). The structure can be represented as follows:

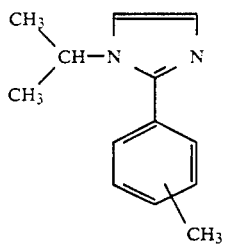

The 1-isopropyl-2-tolyl imidazole demonstrates the following desirable properties as a curing agent:
1. The ortho, meta and para forms all dissolve readily in a variety of epoxy resins.
2. Only small quantities are required to obtain the optimum results for all properties.
3. The composition in its several forms exhibits a low degree of reactivity at ambient temperatures and an increasingly accelerated rate at moderately elevated temperatures.

When the 1-isopropyl-2-tolyl imidazole is combined with an epoxy resin it results in a curing system which exhibits the following desirable properties:
1. The system comprises stable one-component mixtures at ambient temperatures with a high degree of heat and chemical resistance.
2. It adds latency to epoxy systems to which it is added.
3. It provides epoxy curing systems with an extended pot life which may be fully cured with application of moderate heat for relatively short periods of time.
4. The curing agent is a low melting solid when the para-tolyl form is used and liquid when the ortho or meta forms are used.
5. When fully cured the epoxy system has very desirable physical properties with a very high heat distortion temperature.

Products possessing exceptional resistance to heat and chemicals are especially useful in applications such as composite fabrications and sealants.

An epoxy resin which may be cured by the imidazole of this invention may typically be one prepared, for example, by the reaction of Bisphenol A with epichlorohydrin in the presence of sodium hydroxide. After condensation is complete, the crude resin is freed of residual epichlorohydrin, washed well to remove salt and soluble by-products, and recovered. Among those which have demonstrated the effectiveness of the instant invention are diglycidyl ethers of Bisphenol A, such as a liquid epoxy resin of EEW~185 (EEW=epoxy equivalent weight; molecular weight of resin≈380; functionality≈2; equivalent weight≈185-192).

Epoxy resins are normally used without dilution and without other additives. The curing agent in this case is liquid. Many imidazole curing agents are solids. In the novel curing system the imidazole should be present in the epoxy resin in an amount sufficient to provide 1 to 10 parts by weight (pbw) of tolylimidazole curing agent per 100 parts by weight epoxy resin.

Incomplete curing may be accomplished under ambient conditions. Heating is necessary to fully cure the system. When the curing is accomplished at ambient conditions the system exhibits what could be described as "latent" reaction properties. A low degree of activity is exhibited at ambient temperatures, but as the temperature is moderately raised the curing accelerates. In addition, the formulation exhibits less than half as much viscosity as the curing system of U.S. Pat. No. 4,931,528 at temperatures around 23° C. after 24 hours. This allows a much longer time for utilization after mixing. Gel time determinations at various temperatures indicate that at lower temperatures the tolylimidazoles react slowly. When the temperature was raised to about 100° C. or greater there was little difference in the reactivity of the tolylimidazoles compared with the 1-isopropyl-2-methylimidazole. These properties would be very desirable in many application areas.

Curing takes place over a period of 30 minutes to 48 hours. Optimum physical properties developed using shorter cure times once the temperature was elevated.

Practice of the novel method of this invention is apparent from the procedures exemplified in Examples I-VIII, recorded in Table I and II. The method of curing epoxy resins with the tolylimidazoles herein described is also demonstrated in the Examples. The variations in temperature, time and form of tolylimidazole allow for the production of compositions with a variety of desirable properties.

In the Examples the following terms are used to describe properties measured:

Gel Time—Measured in minutes (100 g mass); 100 g of formulation added at ≈23° C. to gel timer container which was maintained at designated temperature. Formulated material allowed to increase in temperature and advance to gelled stage.

Brookfield viscosity—(ASTM D-1824) Internal resistance to flow; ratio of shearing stress to rate of shear measured in centipoises at about 23° C. for different time periods.

Example I demonstrates a formulation containing 1-isopropyl-2-(ortho)-tolyl imidazole as a curing agent and the properties obtained over various periods of time and temperatures.

Example II demonstrates the use of the meta form of the imidazole as a curative and Example III demonstrates the use of the para form of the compound. Example IV is comparative using the imidazole of U.S. Pat. No. 4,931,528.

The following examples are intended only as a means of illustration and are not to be construed as limitative:

1-Isopropyl-2-tolylimidazoles (o-, m- and p-) are much less reactive toward epoxy curing than is a similar material, 1-isopropyl-2-methylimidazole. Each formulation which contained a 1-isopropyl-2-tolylimidazole developed less than one-half the viscosity developed by the 1-isopropyl-2-methylimidazole-containing formulation after 24 hours at 23° C. This is an indication that a much longer time is available for utilization of the tolylimidazoles after mixing which is an important factor in many application areas. Gel time determinations at various temperatures also indicate that at lower temperatures, the tolylimidazoles react slowly. However, at more elevated temperatures (>100° C.), there is little difference in reactivity of the tolylimidazoles or the 1-isopropyl-2-methyl-imidazole.

TABLE 1

| Viscosity Development and Gel Times at Elevated Temperatures for Imidazole-Containing Epoxy Systems | | | | |
|---|---|---|---|---|
| | I | II | III | IV |
| Formulations 6501- | 65A | 65B | 65C | 65D |
| Liquid epoxy resin | 100 | 100 | 100 | 100 |

TABLE 1-continued

Viscosity Development and Gel Times at Elevated Temperatures for Imidazole-Containing Epoxy Systems

| Formulations 6501- | I<br>65A | II<br>65B | III<br>65C | IV<br>65D |
|---|---|---|---|---|
| (EEW 185-192) | | | | |
| 1-Isopropyl-2-o-tolylimidazole | 2 | — | — | — |
| 1-Isopropyl-2-m-tolylimidazole | — | 2 | — | — |
| 1-Isopropyl-2-p-tolylimidazole | — | — | 2 | — |
| 1-Isopropyl-2-methylimidazole | — | — | — | 2 |
| Brookfield viscosity (cps @ 23° C. × $10^{-3}$) | | | | |
| After | | | | |
| 1 hour[1] | 21 | 16.75 | 20.25 | 18.5 |
| 4 hours | 23.25 | 22.5 | 23 | 21.25 |
| 8 hours | 24.25 | 23.5 | 23.25 | — |
| 16 hours | — | — | — | 35 |
| 24 hours | 35 | 30.5 | 29.5 | 74 |
| 28 hours | 36.25 | 29 | 31.75 | 143 |
| 32 hours | 42.5 | 32.75 | 34.5 | — |
| 48 hours | 146 | 56.5 | 63 | — |
| Gel time[2] @ | | | | |
| 60° C. | 229.1 | 307.7 | 281.9 | 124.7 |
| 80° | 58.3 | 78.5 | 69.1 | 38.5 |
| 100° | 32.6 | 45.1 | 40.0 | 19.9 |
| 120° | 22.0 | 30.6 | 24.9 | 14.0 |
| 150° | 13.4 | 18.0 | 15.7 | 8.0 |

[1] Formulation (100 g) thoroughly mixed. Placed in constant temperature bath at 23° C. Viscosity was first measured after 1 hour in bath after heat developed during mixing had subsided.
[2] Measured with Gardco Gel Timer - formulation was thoroughly mixed and poured (100 g) into an aluminum cup. Cup was placed in gel timer that had been conditioned at desired temperature.

TABLE 2

Properties of Epoxy Resins Cured with 1-Isopropyl-2-Tolylimidazoles

| Formulations: 6501- | V<br>46A | VI<br>39A | VII<br>29B | VIII<br>98D |
|---|---|---|---|---|
| Liquid epoxy resin (EEW 185-192) | 100 | 100 | 100 | 100 |
| 1-Isopropyl-2-o-tolylimidazole | 2 | — | — | — |
| 1-Isopropyl-2-m-tolylimidazole | — | 2 | — | — |
| 1-Isopropyl-2-p-tolylimidazole | — | — | 2 | — |
| 1-Isopropyl-2-methylimidazole | — | — | — | 2 |
| Properties of Cured ⅛" Castings cured: 2 Hrs., 100°, 4 hrs., 210° C. | | | | |
| Shore D hardness, 0-10- sec | 90–89 | 89–88 | 93–90 | 94–90 |
| HDT, °C., 264 psi/66 psi load | 194.1 | 272.7 | 242.7 | 219.7 |
| Izod impact strength, ft-lb/in | 0.10 | 0.09 | 0.10 | 0.03 |
| Tensile strength, psi | 3900 | 2500 | 1900 | 3300 |
| Tensile modulus, psi | 380500 | 434000 | 769000 | 416400 |
| Elongation at break, % | 1.1 | 0.6 | 0.4 | 0.9 |
| Flexural strength, psi | 4400 | 5400 | 5900 | 6400 |
| Flexural modulus, psi | 372000 | 382000 | 395000 | 380000 |
| % wt. gain, 24-hr water boil | 1.19 | 0.95 | 0.89 | 1.16 |
| % wt. gain, 3-hr acetone boil | 0.04 | (0.02)[1] | (−0.03)[1] | (0.04)[1] |

[1] Slight loss in weight noted

Comments:
A liquid epoxy resin was cured with each of the 1-isopropyl-2-tolylimidazoles to form heat-, chemical- and moisture-resistant panels. HDT (heat deflection temperature) values for each of the formulations were quite high. Properties were either equal to or improved over those obtained on curing with a more reactive imidazole, 1-isopropyl-2-methylimidazole.

What is claimed is:

1. An epoxy resin curative composition comprising:
   (1) 1 to 10 parts by weight 1-isopropyl-2-tolylimidazole, and
   (2) 100 parts by weight epoxy resin.

2. The composition of claim 1 wherein the imidazole is 1-isopropyl-2-(ortho)tolylimidazole.

3. The composition of claim 1 wherein the imidazole is 1-isopropyl-2-(meta)tolylimidazole.

4. The composition of claim 1 wherein the imidazole is 1-isopropyl-2-(para)tolylimidazole.

5. The composition of claim 1 wherein the epoxy resin is a diglycidyl ether of Bisphenol A having an epoxy equivalent weight (EEW) of 185 to 192.

6. The composition of claim 1 at a temperature of from about 10° C. to about 210° C.

7. The composition of claim 1 at a temperature of from about 60° C. to about 150° C.

8. The composition of claim 1 wherein the system is cured for from 30 minutes to about 48 hours.

9. A method for curing an epoxy resin comprising adding 1 to 10 parts by weight of 1-isopropyl-2-tolylimidazole to 100 parts by weight epoxy resin at a temperature of from 10° C. to 150° C. for a period of 30 minutes to 48 hours.

10. The method of claim 10 wherein the imidazole is 1-isopropyl-2-(ortho)-tolylimidazole.

11. The method of claim 10 wherein the imidazole is 1-isopropyl-2-(meta)tolylimidazole.

12. The method of claim 10 wherein the imidazole is 1-isopropyl-2-(para)tolylimidazole.

* * * * *